(12) United States Patent
Sommer

(10) Patent No.: US 8,092,882 B2
(45) Date of Patent: Jan. 10, 2012

(54) SPORTS EQUIPMENT WITH RESONANT CORE BODIES AND METHOD FOR PRODUCTION THEREOF

(76) Inventor: Roland Sommer, Taichung Shien (TW)

( * ) Notice: Subject to any disclaimer, the term of this patent is extended or adjusted under 35 U.S.C. 154(b) by 162 days.

(21) Appl. No.: 12/459,688

(22) Filed: Jul. 7, 2009

(65) Prior Publication Data

US 2010/0160094 A1 Jun. 24, 2010

Related U.S. Application Data

(63) Continuation of application No. 10/169,541, filed as application No. PCT/EP00/13285 on Dec. 27, 2000, now abandoned.

(30) Foreign Application Priority Data

Dec. 27, 1999 (DE) .................................. 199 63 241

(51) Int. Cl.
*B29D 22/00* (2006.01)
*B29D 23/00* (2006.01)
*B32B 1/08* (2006.01)

(52) U.S. Cl. .................. 428/36.91; 428/36.9; 428/35.6; 428/36.4; 473/520; 473/521; 473/522; 473/523

(58) Field of Classification Search .................. 428/36.9, 428/36.91, 35.6, 36.4; 473/520, 521, 522, 473/523

See application file for complete search history.

(56) References Cited

U.S. PATENT DOCUMENTS

| | | | |
|---|---|---|---|
| 1,508,286 A | 9/1924 | Moore | |
| 2,878,020 A | 3/1959 | Robinson | |
| 3,949,988 A | 4/1976 | Staufer | |
| 4,165,071 A | 8/1979 | Frolow | |
| 4,182,512 A | 1/1980 | Kuebler | |
| 4,291,574 A | 9/1981 | Frolow | |
| 4,357,013 A | 11/1982 | Fernandez et al. | |
| RE31,419 E | 10/1983 | Frolow | |
| 4,690,405 A | 9/1987 | Frolow | |
| RE33,372 E | 10/1990 | Frolow | |
| 5,174,568 A | 12/1992 | You | |
| 5,236,198 A | 8/1993 | Haines et al. | |
| 5,409,215 A | 4/1995 | You | |
| 5,454,562 A | 10/1995 | Sommer | |

(Continued)

FOREIGN PATENT DOCUMENTS

DE 26 21 062 A 12/1976

(Continued)

OTHER PUBLICATIONS

PCT/EP00/13285 Search Rpt, Jul. 3, 2001, Roland Sommer.

*Primary Examiner* — Michael C Miggins
(74) *Attorney, Agent, or Firm* — Duane Morris LLP

(57) ABSTRACT

Provided is a shaped body for production of sports equipment such as tennis, squash, and badminton rackets, golf clubs, hockey and ice hockey sticks and baseball bats. The shaped body includes a core of two tubular resonant bodies, running parallel to and spaced at a distance from each other and surrounded by a common covering. A spacer body with convexly curved opposed ends is arranged between the resonant bodies, whereby the mass of the resonant bodies is greater than that of the spacer body. The vibrations of the two vibrating systems, in the form of the resonance bodies, are overlaid in an advantageous manner, by means of the coupling of the resonance bodies. The invention further relates to a method for the production of the shaped body and the use of the shaped body in sports equipment.

22 Claims, 7 Drawing Sheets

U.S. PATENT DOCUMENTS

| | | |
|---|---|---|
| 5,460,370 A | 10/1995 | Tung-Han |
| 5,516,100 A | 5/1996 | Natsume |
| 5,716,476 A | 2/1998 | Dohn |
| 5,796,005 A | 8/1998 | Frolow |
| 6,203,455 B1 | 3/2001 | Scherubl |

FOREIGN PATENT DOCUMENTS

| | | |
|---|---|---|
| DE | 27 41 741 A | 3/1978 |
| DE | 39 22 701 A | 1/1991 |
| EP | 0 235 777 A | 9/1987 |
| GB | 1 434 741 A | 5/1976 |

SPORTS EQUIPMENT WITH RESONANT CORE BODIES AND METHOD FOR PRODUCTION THEREOF

RELATED APPLICATION

This is a continuation of application Ser. No. 10/169,541 filed Oct. 30, 2002 now abandoned which is the national stage of international application PCT/EP00/13285 filed on Dec. 27, 2000 and which claims priority to DE application 199 63 241.3, filed Dec. 27, 1999. The contents of each of these applications are hereby incorporated by reference, as if set forth in their entireties.

FIELD OF THE INVENTION

This invention pertains to a structural member for the manufacture of sports equipment, in particular sports hitting tools such as tennis, squash and badminton racquets, golf clubs, field hockey and ice hockey sticks, and baseball bats. The invention also pertains to a process for the manufacture of the structural member.

BACKGROUND

In ball sports requiring a hitting tool to play them, it is well known that significant shock impulses and resonant vibrations occur as a reaction to the impact of the hitting tool with the ball. The distinct vibrations represent a considerable risk of injury for the arm, the shoulder and the spine of the player. For example, there is the so-called tennis elbow condition, in which, due to the vibration of the racquet, a significant local increase of tissue metabolism occurs along with leukocyte migration in the tissue. Tennis elbow is observed very frequently and causes great pain for a tennis player.

Conventional tennis racquets tend to have disadvantageous vibration behavior after impacting the ball, producing especially large impulses of energy. The design of known tennis racquets is such that an amplitude maximum occurs in the handle, and thus in the hand of the player.

German utility model specification DE 29805032 U1 describes a racquet frame for a tennis, badminton or squash racquet. The known frame is made from a single, tubular fiber-reinforced plastic. The tubular plastic part has an elliptical cross section, the longitudinal sides of which are connected to one or two cross members thus forming chambers within the single plastic part.

With two ribs, a center chamber is formed that holds a foam element. Due to the elliptical shape of the cross section, the plastic part has its largest width at its center, through which the strings of the webbing pass via holes. This results in the mass being concentrated mostly in the center.

Furthermore, in the American patent specification U.S. Pat. No. 5,516,100, a frame for a tennis racquet is known which is bent from a single tubular profile element that has the cross sectional shape of a bean. Within the single profile element is a stiffening rib that connects the two longitudinal sides of the bean-shaped cross section. A string guide strip is embedded in the stiffening rib, providing sleeves through which to feed the strings of the webbing.

AT 388 106 describes a frame for ball racquets that is designed from a center strip and hollow profiles attached to both sides of the middle strip. The middle, strip consists of a thermoplastic, Duroplast, an elastomer, rubber, ceramic, wood, metal, or similar material.

U.S. Pat. No. 4,357,013 describes a structure for a tennis racquet frame that is designed from two outer members with a honeycomb structure and a core lying between them. A common covering encloses the two members and the core. The core is made from a plastic sheet rolled into a spiral and layered.

The frame designs described above according to the state of the technology result in disadvantageous vibration behavior of the racquet when the ball impacts the webbing or the frame itself, with the vibration behavior leading to bodily injury such as tennis elbow.

Therefore, the objective of this invention is to design a structural member for the manufacture of sports equipment, in particular a sports hitting tool such as tennis, squash and badminton racquets, golf clubs, field hockey and ice hockey sticks and baseball bats, that exhibits favorable vibration behavior and thus present no health risk to the player, and to do so without increasing the overall mass of the sports equipment or decreasing its strength. Moreover, it is the objective of this invention to provide a process that enables the manufacture of such a structural member.

SUMMARY OF THE INVENTION

According to one aspect, provided is a structural member to manufacture a sports equipment, in particular tennis, squash, badminton racquets, golf clubs, field hockey and ice hockey sticks and baseball bats. The structural member has two hollow cylindrical resonating elements arranged in parallel and having outer and inner surfaces that are each continuously convexly curved in a latitudinal cross section thereof, spaced at a distance from one another and enclosed by a common covering with nothing interposed between the common covering and the hollow cylindrical resonating elements. A distancing element is disposed between the resonating elements, and is characterized in that the mass of each resonating element is greater than the mass of the distancing element. The compressive strength of the distancing element is the highest in the direction of an axis that connects the center points of the resonating elements. The distancing element includes opposed concave ends that are conterminous with each of the respective curved outer surfaces of the resonating elements.

According to another aspect, provided is structural member to manufacture a sports equipment, the structural member comprising two single layer hollow cylindrical resonating elements arranged in parallel and spaced at a distance from one another. A distancing element is disposed directly between the resonating elements. A common covering is disposed directly on and internally contacting only the resonating elements and the distancing element, characterized in that the mass of each resonating element is greater than the mass of the distancing element and the compressive strength of the distancing element is the highest in the direction of an axis that connects center points of the resonating elements. Each of the hollow cylindrical resonating elements have inside and outside surfaces that are each continuously convexly curved in a latitudinal cross section thereof. The sports equipment may be one of a tennis racquet, a squash racquet, a badminton racquet, a golf club, a field hockey stick, an ice hockey stick and a baseball bat.

According to another aspect, provided is a sports racquet comprising a handle, a frame, and strings disposed in a first plane, the frame peripherally surrounding the strings and including a structural member having two hollow cylindrical resonating elements arranged in parallel, spaced at a distance from one another and having a distancing element disposed therebetween. The distancing element is disposed along an axis connecting respective center points of the resonating elements and being generally orthogonal to the plane. Each hollow cylindrical resonating element may be formed of a single layer of material having opposed inner and outer surfaces having the same shape and each of the inner and outer surfaces is continuously convexly curved along a latitudinal cross section of the hollow cylindrical resonating element. The resonating elements and distancing element are enclosed by a common covering that conformally covers the resonating elements and distancing element.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features are arbitrarily expanded or reduced for clarity. Like numerals denote like features throughout the specification and drawing.

DETAILED DESCRIPTION

Figure 1:
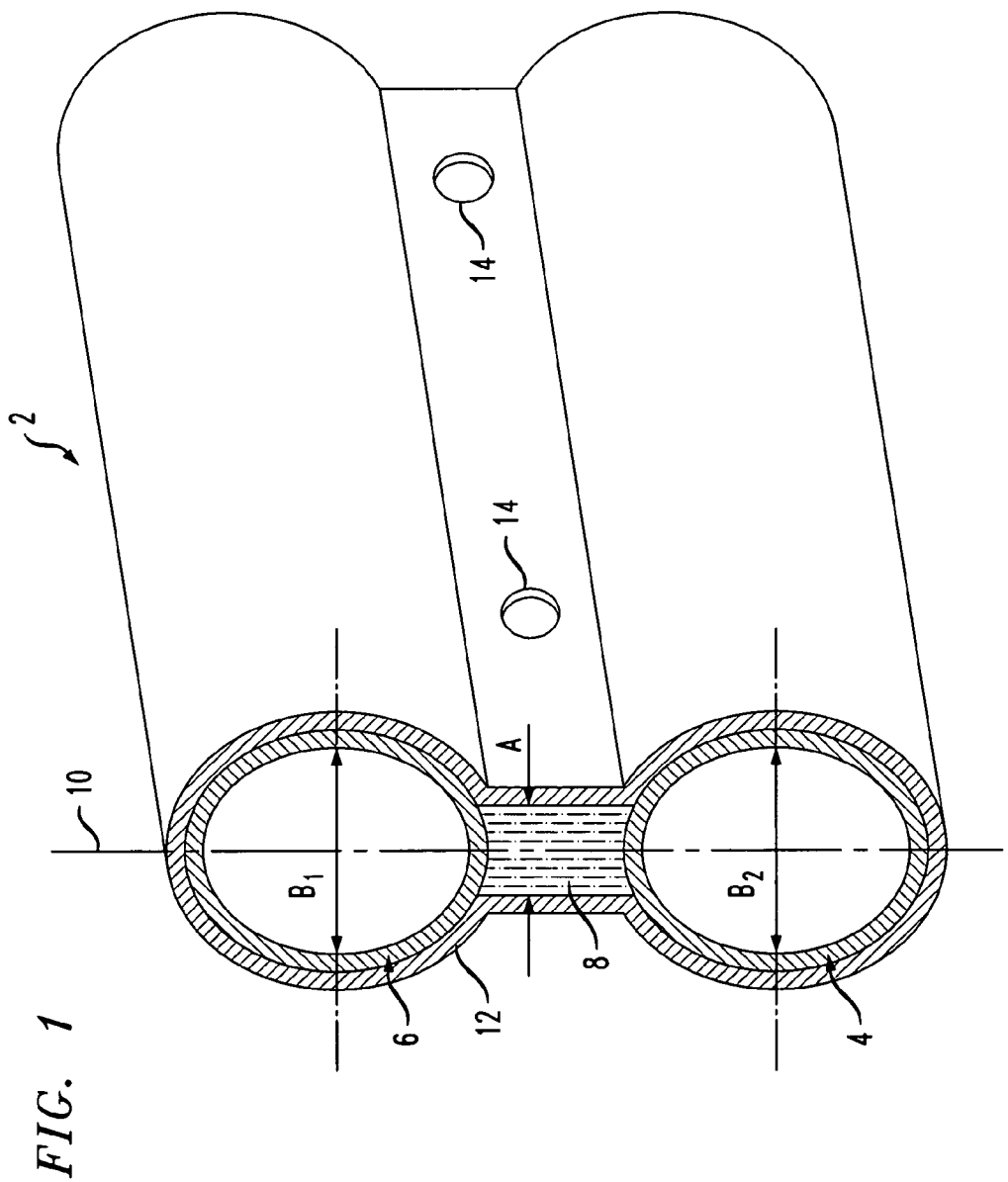
FIG. 1 shows a perspective representation of the structural member according to the invention in a simple first embodiment

The structural member according to the invention to manufacture sports equipment has two tubular resonating elements running in parallel. The resonating elements can have any desired cross section and are separated from one another. Both resonating elements are enclosed by a common covering, with a distancing element being located between the resonating elements such that they are coupled together. The compressive strength of the distancing element is different in different directions, with the compressive strength being greatest in the direction of an axis connecting the center points of the resonating elements. The result is that the direction of the greatest compressive strength runs perpendicular to the longitudinal axis of the resonating elements, said direction facing each resonating element. The distancing element thus creates a coupling effect between two vibrating systems, each of which is constituted by a single resonating element. It is also enclosed by the common covering. Each of the two individual resonating elements has a mass that is larger than the mass of the distancing element.

In contrast to the state of the technology, the structural member according to the invention has a core of two tubular resonating elements, each of which constitutes a vibrating system, with the two vibrating systems being coupled through a distancing element whose compressive strength is the greatest in the direction of an axis that connects the center points of the resonating elements. The coupling of the two resonating elements, each of the individual masses of which is greater than the mass of the distancing element, is effected by means of this distancing element such that the vibrations of the individual resonating elements are superimposed in an advantageous manner. Thus, for example, for a tennis racquet that had been manufactured from the structural member according to the invention, the amplitude maximum no longer exists at the handle when impacting the ball, and thus not in the players hand. In this way, the players arm is relieved and the danger of developing tennis elbow is eliminated. The shift of the mass from the center of the distancing element to the exterior resonating elements by means of the structural member according to the invention also results in improved bending characteristics of the structural member about its longitudinal axis since the external area subject to high tensile/compressive stresses is enlarged.

It is, moreover, necessary to have the greater compressive strength of the distancing elements be perpendicular to the longitudinal axis in order to maintain the distance between the resonating elements even under extreme conditions, such as those occurring during the pressing process. In the latter case, this high material durability is very important since the distancing element must withstand the internal pressure in the two resonating elements. It is preferable for the distancing element to be partially elastic perpendicular to the axis that connects the center points of the resonating elements, thereby making it possible, for one thing, to adjust to the contour of the structural member during the mechanical pressing process, and for another so that the necessary internal pressure can be developed.

A tennis racquet, for example, can be manufactured from the structural member according to the invention, said racquet having a low weight of less than 290 g. Moreover, the resonance frequency of this ready-to-use racquet is higher than 170 Hz, and its stiffness is at least RA70.

In an advantageous embodiment of the structural member according to the invention, the distancing element is made of wood or a material similar to wood, i.e. a material having a preferential direction. The resonating element can also be made of plywood or a multi-layered or laminated wood having a preferential direction, but can also be made of pressed wood.

In an especially advantageous embodiment of the structural member according to the invention, the distancing element is made of balsa wood. In the case of balsa wood, the distancing element is arranged such that the fibers of the balsa wood run parallel to the axis that connects the center points of the resonating elements. The balsa wood meets the requirements mentioned above for the distancing element, while at the same time exhibiting a low density, thereby providing a distancing element with a low weight. In addition, plastic filling can be eliminated, thus contributing to an environmental friendly design of the sports hitting tool. If laminated wood is used, its preferential direction should run parallel to the axis that connects the center points of the resonating elements.

There are other types of woods, such as cork for example, that are suitable as materials for the distancing element. Moreover, other materials can be considered, such as honeycomb, corrugated or tubular materials made of aluminum, paper and certain plastics resistant to high temperatures.

In an advantageous embodiment of the structural member according to the invention, the width of the resonating elements is greater than the width of the distancing element so that the structural member narrows near the distancing element. The distancing element is designed in such a way that the forces are absorbed by the webbing and so that the resonating elements are coupled.

In another advantageous embodiment of the structural member according to the invention, the covering has a greater wall thickness at the side of the resonating element that faces away from the opposite resonating element. Designing the covering in this way locates a majority of the mass of the structural member at the resonating elements and thus no longer in the center of the structural member. The larger wall thickness produces a larger resistance against bending about the longitudinal axis of the structural member.

In another embodiment of the structural member according to the invention, the covering is advantageously designed in single or multiple layers of various plastic-impregnated laminar materials. The covering has a first section with a number of laminar material layers one on top of the other on the side of the resonating element that faces away from the resonating element opposite to it. These first sections are connected via two second sections, with the laminar materials of the first sections overlapping the laminar materials of the second sectioris in the transition zone. The laminar materials of the first section are thicker and/or more numerous than the laminar materials of the second section so that more mass is allocated to the resonating elements.

In another advantageous embodiment of the invention, the plastic-impregnated laminar material is made of GFK (glass fiber reinforced plastic), AFK (aramide or Kevlar fiber reinforced plastic), CFK (carbon fiber reinforced plastic), KFK (same as CFK), or MFK (metal fiber reinforced plastic) fiber-reinforced plastic in a resin matrix, or of other metal or plastic layers, fabrics or foils that can absorb external forces.

In another advantageous embodiment of the invention, at least one mass support strip with chambers is placed on the wall of at least one resonating element. Freely moving mass particles or fluid droplets are contained in these chambers, damping vibrations and absorbing the recoil of a sports hitting tool. A tennis racquet manufactured from the structural member according to the invention has a frame and a handle, both of which are produced from a structural member so that a mass support strip is located in the frame and/or in the handle. This allows the damping effect of the mass support strip to be utilized in the handle as well.

The process according to the invention to manufacture a structural member comprises the process steps of: placing two tubular resonating elements in parallel with a distancing element in between them, wherein the distancing element is oriented such that the direction of maximum compressive strength of the distancing element runs parallel to an axis that connects the center points of the resonating elements; attaching plastic-impregnated laminar materials that surround the resonating element and the distancing element only partially, with each individual laminar material layer overlapping another laminar material only at the side of the resonating element that faces away from the respective resonating element opposite to it; placement into a heated die; producing a mechanical pressure in the resonating elements and laterally deforming the distancing element by means of a punch located in the die; hardening within the die. Since the plastic-impregnated laminar materials do not completely enclose the resonating elements and the distancing element, the covering is composed of multiple strips of laminar materials, with the strips overlapping one another. In this way, laminar materials with varying thicknesses can be used at different points of the covering so that a very precise distribution of the mass can be done along the covering. This makes it possible to use thicker laminar materials or even more laminar materials at the side of the resonating element that faces away from its opposite resonating element than at the other sides so that the mass is greater there. In the process according to the state of the technology, this is impossible since the laminar materials are applied as a single wound sheet, making it impossible to graduate the wall thickness.

In an especially advantageous embodiment of the process according to the invention, the distancing element is laterally penetrated at certain points after the distancing element is laterally deformed and prior to or during the hardening process. This displaces the fibers of the covering, keeping them from being destroyed. The through holes resulting from this serve to provide supports for the strings of the webbing. By preventing the fibers of the covering from being destroyed, which is accomplished in the state of the technology by drilling them after the hardening step, the strength in this area remains intact for the most part.

In other preferred embodiments of the process according to the invention, the covering and the distancing element in the die are penetrated from one side by a pin, or two pins are pushed through the covering into the distancing element from opposite sides until their ends meet within the distancing element. The resultant through holes can serve to hold the strings of the webbing, for example.

FIG. 1 shows a perspective view of the structural member according to the invention in a simple first embodiment. The structural member 2 has two tubular resonating elements 4, 6 that are arranged parallel to and at a distance from one another. Between the resonating elements 4, 6 is a distancing element 8 that lies adjacent to the resonating elements 4, 6, said distancing element coupling the two vibrating systems, which consist of the resonating elements 4, 6. The distancing element 8 extends between the resonating elements 4, 6 along the entire length of the structural member 2 and its width A is less than either width $B_1$, $B_2$ of the resonating elements 4, 6 so that in addition, by proper dimensioning, the mass ratio between either resonating element 4, 6 and the distancing element 8 is greater than 1. Moreover, the distancing element 8 is made of a balsa wood that has a low density. The distancing element 8 has its greatest compressive strength in the direction of an axis 10 that connects the center points of the two resonating elements; thus, the fibers of the balsa wood are arranged in the direction of the axis 10. A common covering 12 encloses the two resonating elements 4, 6 and the distancing element 8 located between them. The structural member 2 has penetration holes 14 made in the distancing element 8 along its entire length; said holes placed one after the other at specific intervals. The holes 14 extend perpendicular to the axis 10 through the distancing element 8 as well as through the area of the covering 12 that encloses the distancing element 8 at the side. The purpose of the holes 14 is to hold strings (not shown) of the webbing in the case of the structural member 2 being used to manufacture a tennis racquet frame.

Figure 1A:
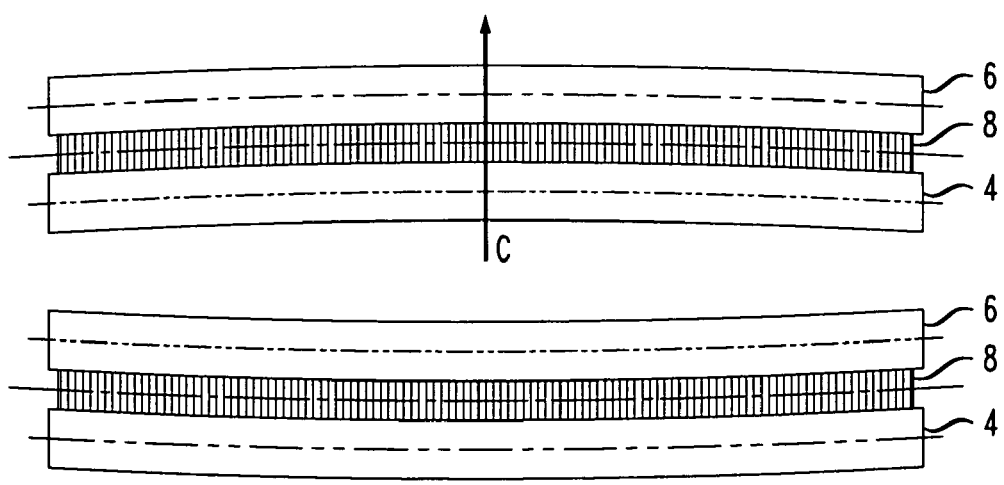
FIG. 1a shows the functioning principle of the structural member according to the invention with the first simple embodiment in FIG. 1 as an example.

FIG. 1a shows the functioning principle of the structural member according to the invention using the first embodiment in FIG. 1 as an example. In FIG. 1a, two side views of the structural member in FIG. 1 are shown without the covering. If the structural member shown at the top in FIG. 1a is deflected or bent in the direction of arrow C, tensile stresses occur in the upper resonating element 6 and compressive stresses occur in the lower resonating element 8 as a result of the coupling of the two resonating elements 4, 6 by the distancing element 8. If the load imposed in the direction of arrow C is released, the structural member oscillates from this deflected position backward and arrives at the state shown at the bottom of FIG. 1*a* in which resonating element 6, which was previously subjected to tensile stresses, is compressed and resonating element 4, which was previously subjected to compressive stresses, is stretched. As the oscillation proceeds, these states alternate back and forth. The distancing element 8 functions as a neutral fiber such that it is essentially free of bending tension and compression stresses. Thus, the only direction in which the distancing element 8 is subject to compressive stresses is in the direction of the axis 10 shown in FIG. 1, effectively transferring the deviation of one resonating element 4, 6 onto the other resonating element 6, 4. By coupling the resonating elements 4, 6, their resonance frequencies are superimposed, resulting in a main frequency that is not a resonant frequency. In the case where the resonating elements are not coupled together, they will vibrate at a certain resonant frequency similar to a taught string. The coupling of the resonating elements now causes the vibrations of one element to influence the vibrations of the other element in such a way that results in phase shifts, and thus in the effects mentioned. The resonating elements together with the distancing element represent a strongly damped system, with the damping being dependent on the characteristics of the material.

Figure 2:
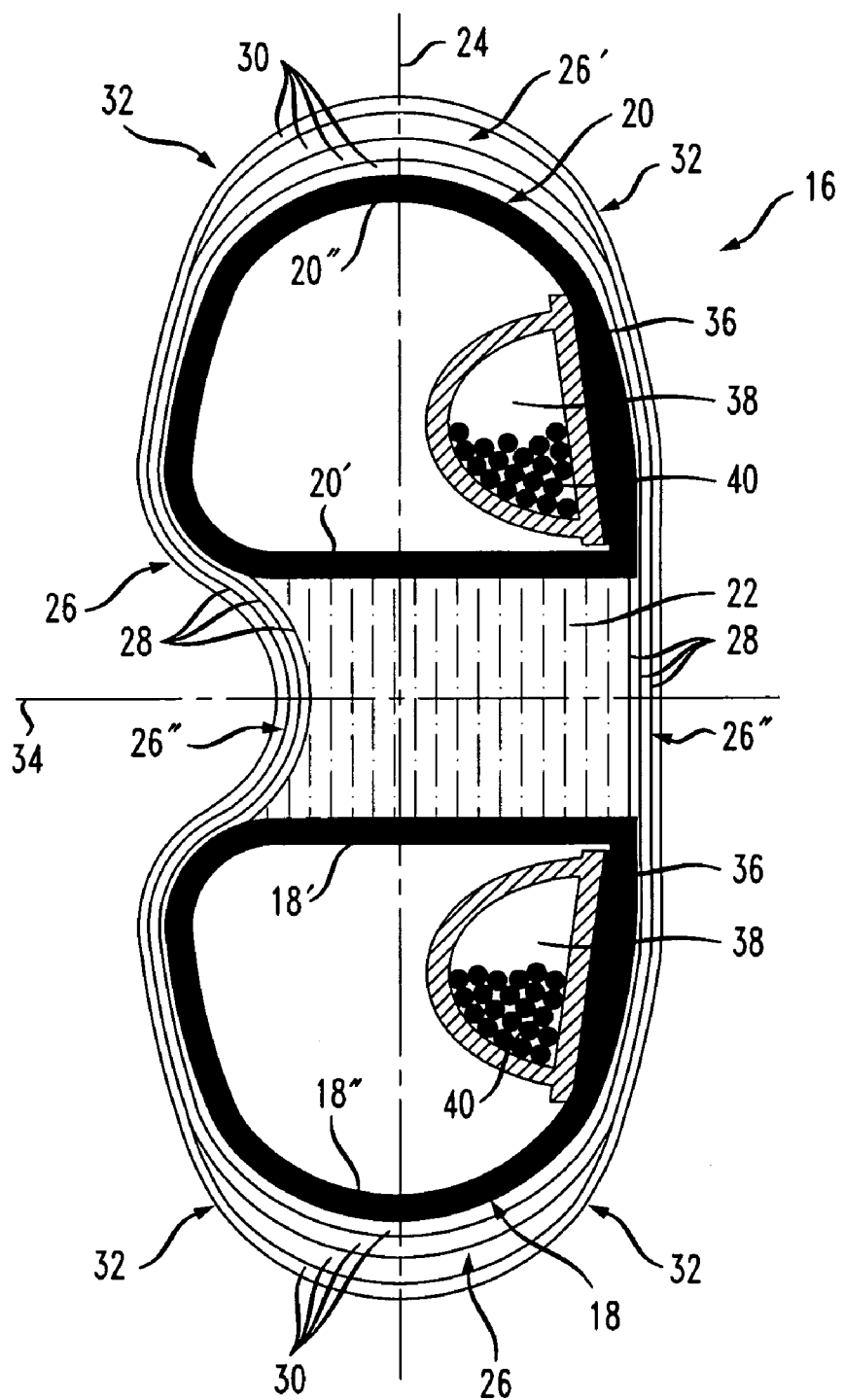
FIG. 2 shows the cross section of the structural member according to the invention in a second embodiment.

FIG. 2 shows a cross section of the structural member according to the invention in a second embodiment. The structural member 16 has two tubular resonating elements 18, 20 that are arranged parallel to and at a distance from one another. Between the resonating elements 18, 20 is a distancing element 22 adjacent to them that is made of balsa wood, the fibers of which extend parallel to an axis 24 that connects the center points of the resonating elements 18, 20 so that the direction of greatest compressive strength of the distancing element 22 faces the resonating elements. As in the first embodiment, the distancing element 22 has a smaller width than either of the individual resonating elements 18, 20 so that the cross section of the structural member 16 narrows in the middle. The mass of either of the individual resonating elements 18, 20 is greater than the mass of the distancing element 22.

At the sides 18', 20' of the resonating elements 18, 20 facing one another, the resonating elements are flat so that the distancing element 22 rests against them evenly. The sides 18", 20" of the resonating elements 18, 20 facing away from the opposite resonating element, respectively, are curved outward and are narrower than sides 18', 20' so that the cross section of the resonating elements 18, 20 is tapered beginning from the distancing element 22 outward.

A common covering 26 encloses the two resonating elements 18, 20 and the distancing element 22 located in between them. The covering 26 is made of two first sections 26' and two second sections 26". The first sections 26' are arranged at sides 18", 20" of the resonating elements 18, 20 that face away from the opposite resonating element 20, 18, respectively, and are made of multi-layered stacked plastic-impregnated laminar materials 30. The second sections 26" run essentially in the direction of axis 24 and connect the first sections 26' to one another. The second sections 26" are also made of multi-layered, stacked plastic-impregnated laminar materials 28, with the laminar materials 30 of the first sections 26" being thicker. In addition, there are more laminar materials in the first sections 26' so that the majority of the mass is shifted toward the sides 18", 20" of the resonating elements 18, 20 that face away from one another, and so that the wall thickness of the covering 26 is designed to be stronger in this area. In the transition zone 32 in which the first sections 26' are connected to the second sections 26", the individual laminar materials 30 of the first sections 26' overlap the laminar materials 28 of the second sections 26". Moreover, the cross section of the structural member 16 is narrowed on one side of the distancing element 22 in the direction of a perpendicular axis 34, resulting in the compression of the distancing element.

On the walls of the two resonating elements 18, 20 is a mass support strip 36. The mass support strips 36 have individual chambers 38 in which mass particles 40 are held that are free to move and act to dampen the vibrations and to absorb the recoil of a sports hitting tool. The individual chambers 38 occupy less than half of the inner volume of the resonating elements 18, 20.

The advantages of the structural member according to the invention identified in FIGS. 1 and 2 will be discussed later with reference to FIGS. 6 through 11.

Figure 3:
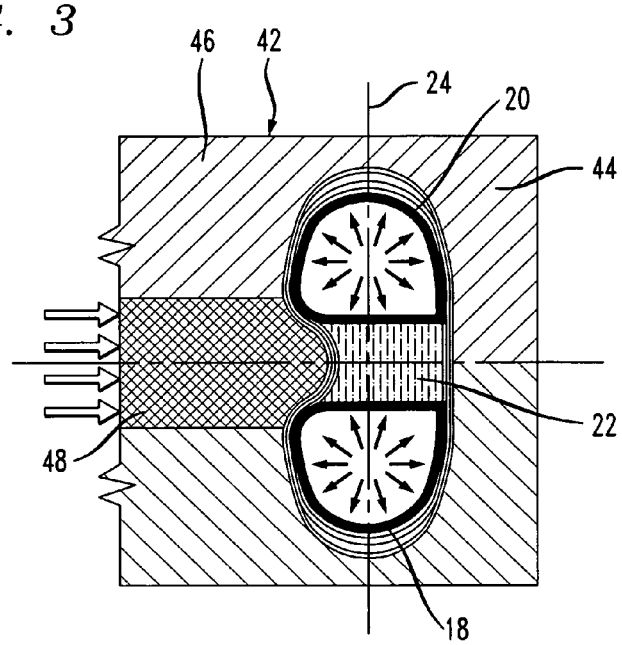
FIG. 3 shows a representation of the process according to the invention in a first embodiment.

FIG. 3 shows a representation of the process according to the invention in a first embodiment. First of all, the two resonating elements 18, 20 are arranged in parallel, with the distancing element 22 placed in between them, the distancing element 22 being oriented such that the direction of maximum compressive strength of the distancing element 22 runs parallel to the axis 24 that connects the center points of the resonating elements 18, 20. In the case of a distancing element 22 made of balsa wood, the fibers of the balsa wood face in the direction of the adjacent resonating elements 18, 20. Subsequent to this, plastic-impregnated laminar materials are applied, said laminar materials only partially surrounding the resonating elements 18, 20 and the distancing element 22 and overlapping only at the sides 18", 20" of the resonating elements 18, 20 (FIG. 2). Then, the unfinished assembly is placed in a die 42 consisting of two die halves 44, 46, whereupon the die is heated. Then, mechanical pressure is produced within the resonating elements 18, 20 that expands the resonating elements 18, 20 and that presses the laminar materials constituting the covering against the wall of the die halves 44, 46. An internal pressure of this type can be produced, for example, using pressure hoses in the resonating elements 18, 20. Because of the high compressive strength of the distancing element 22 in the direction of the axis 24, the pressure is not able to compress the distancing element to a considerable extent. At the same time, the distancing element 22 is pressed in laterally by means of a punch 48 located in die half 46 so that the structural member narrows in the middle. The distancing element 22 is partially deformed laterally in this way, but also provides the necessary reverse pressure required during pressing. Then, the structural member thusly shaped is hardened in the die.

Figure 4:
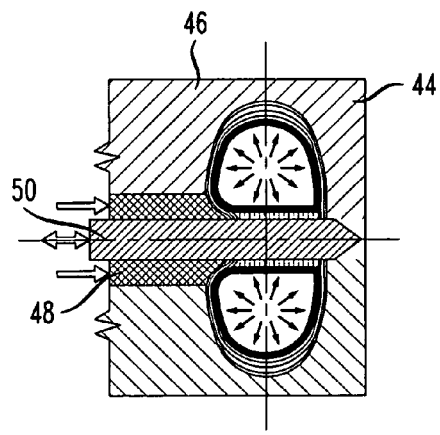
FIG. 4 shows a representation of the process according to the invention in a second embodiment.
Figure 5:
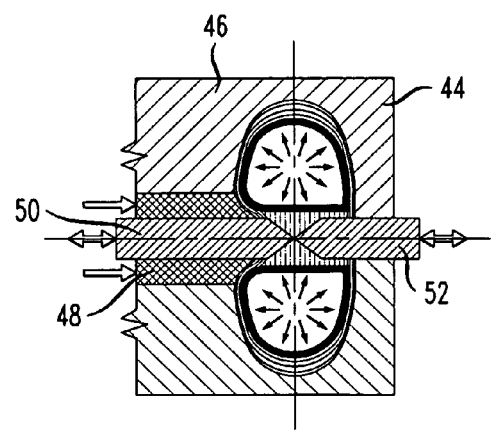
FIG. 5 shows a representation of the process according to the invention in a third embodiment.

FIGS. 4 and 5 show a representation of the process according to the invention in a second and third embodiment. Both processes involve the lateral penetration at points along the covering and the distancing element 22 after the lateral deformation by the punch 48 and before or during the hardening. This produces a through hole for the strings of the webbing without significantly reducing the strength in this area. The penetration is made using a pin that is designed in such a way that the fibers of the covering are displaced and not destroyed.

In the second embodiment of the process according to the invention (FIG. 4), a moving pin 50 is located inside the punch 48, said pin penetrating the covering and the distancing element 22 of the structural member 16 from one side. In the third embodiment of the process according to the invention (FIG. 5), the moving pin 50 is pushed through the covering and into the distancing element 22 on one side and an opposing pin 52 located coaxially in die half 44 is pushed through on the other side until the ends of the pins 50, 52 touch inside the distancing element 22.

Figure 6:
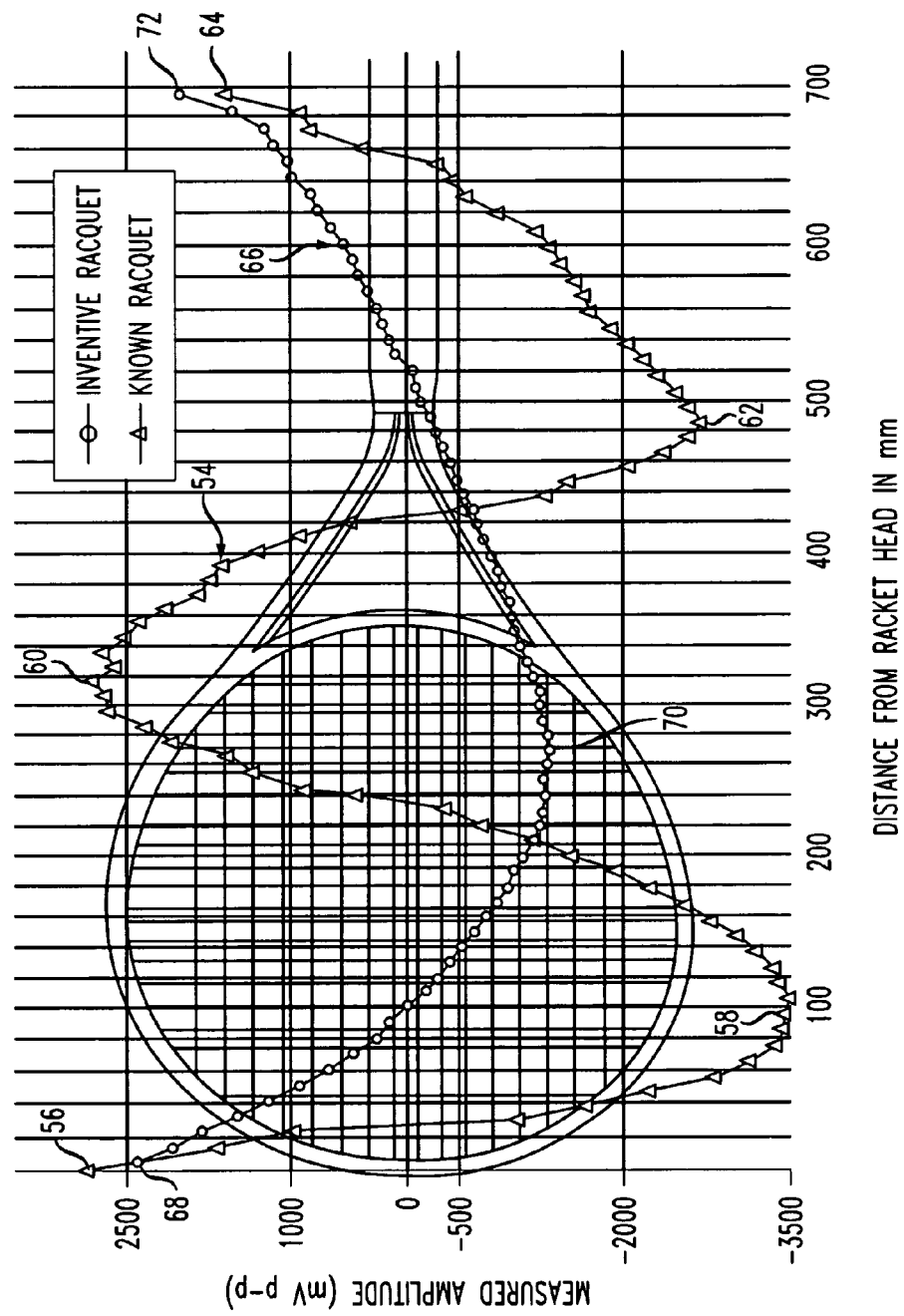
FIG. 6 shows a representation of the amplitude profile along the length of a tennis racquet with a frame according to the state of the technology and with a frame made of the structural member according to the invention.

FIG. 6 shows a representation of the amplitude profile along the length of a tennis racquet with a frame according to the state of the technology and with a frame made of the structural member according to the invention. The frame according to the state of the technology is made of a single tubular part with internal ribs to provide stiffening, if necessary. Moreover, the mass of the frame is concentrated essentially at the center of its cross section. The structural member according to the invention is shown in FIG. 2, wherein the essential difference is that according to the invention two resonating elements are provided instead of only one resonating element, with the two resonating elements being coupled together. Moreover, according to the invention, the mass is not concentrated in the center of the cross section. The amplitude profile 54 for the known racquet has five amplitude maxima 56, 58, 60, 62, 64 along the length of the racquet, with the amplitude maxima 62 and 64 being located at the handle of the racquet. Thus, the hand and arm of the player are subjected to a large vibration amplitude, which for one thing makes it more difficult to handle the racquet and for another leads to the injuries described in the beginning, such as tennis elbow. In contrast, the amplitude profile 66 for a racquet with a frame made of the structural member according to the invention has only three amplitude maxima 68, 70, 72, with the amplitude profile 66 at the racquet handle showing that the handle of the racquet according to the invention vibrates with a comparatively lower amplitude. In this manner, the handling of the racquet is made easier, and there is less danger of injury.

Figure 7:
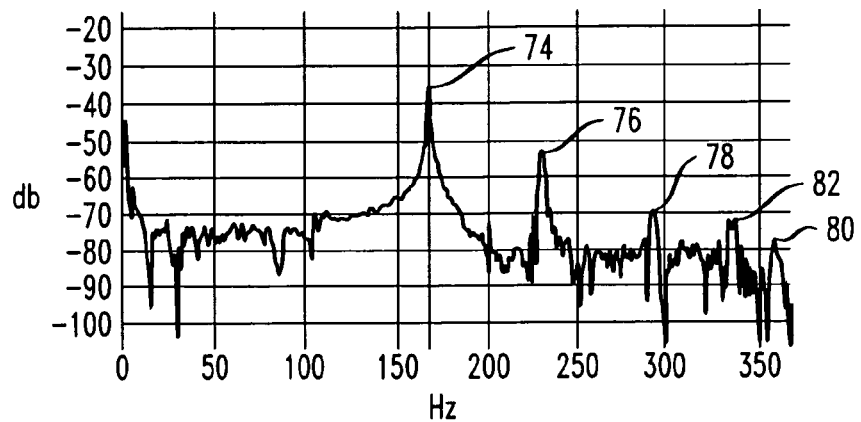
FIG. 7 shows the frequency spectrum of a tennis racquet with webbing according to the state of the technology.

FIG. 7 shows the frequency spectrum of a common tennis racquet with webbing, said racquet having only one resonating element as its frame according to the state of the technology. The known racquet exhibits a distinct resonant frequency 74 along with its harmonic overtones 76, 78, 80, which are common for a frame made of only one resonating element. Moreover, the frequency 82 of the vibrating string can be seen.

Figure 8:
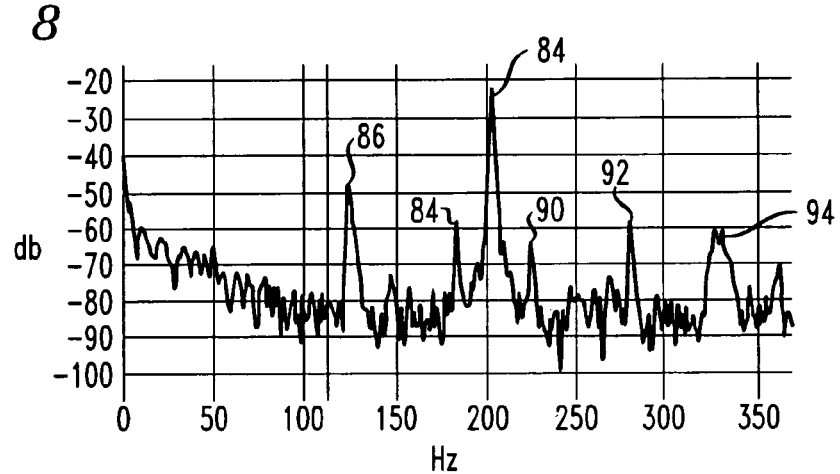
FIG. 8 shows the frequency spectrum of the tennis racquet according to the invention with webbing at weak excitation.

FIG. 8 shows the frequency spectrum of the tennis racquet according to the invention with webbing at weak excitation, i.e. wherein the excitation is carried out using minimal force (bending). The frequency spectrum also has a distinct measurable resultant main frequency 84. However, in this case this frequency is the differential mixed product between the lowest resonant frequencies 86, 88 and the highest resonant frequencies 90, 92, respectively, of the two resonating elements. Thus, the fundamental oscillation exhibits a higher frequency than the fundamental oscillation of a common racquet. In the process, the distance between the lowest and the highest resonant frequency 86, 92 to the measurable resultant main frequency 84 is small (minimal bending). In addition, the vibration frequency 94 of the string can be seen.

Figure 9:
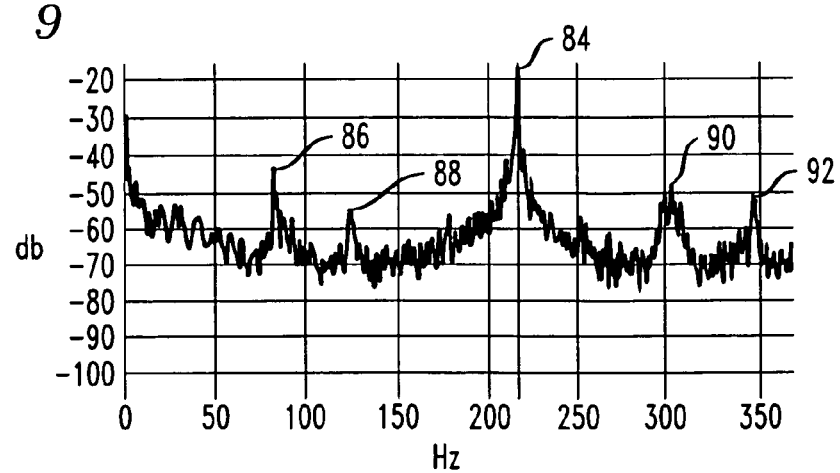
FIG. 9 shows the frequency spectrum of the tennis racquet according to the invention without webbing at strong excitation.

FIG. 9 shows the frequency spectrum of the tennis racquet according to the invention without webbing at strong excitation, corresponding essentially to the frequency spectrum in FIG. 8. The distance between the lowest and highest resonant frequencies 86, 92 to the measurable resultant main frequency 84 is, however greater (more bending). Also, the vibration frequency 94 of the string is missing since the racquet is not strung, thus producing a clear shift of the entire frequency spectrum upward due to the reduction in mass.

Figure 10:
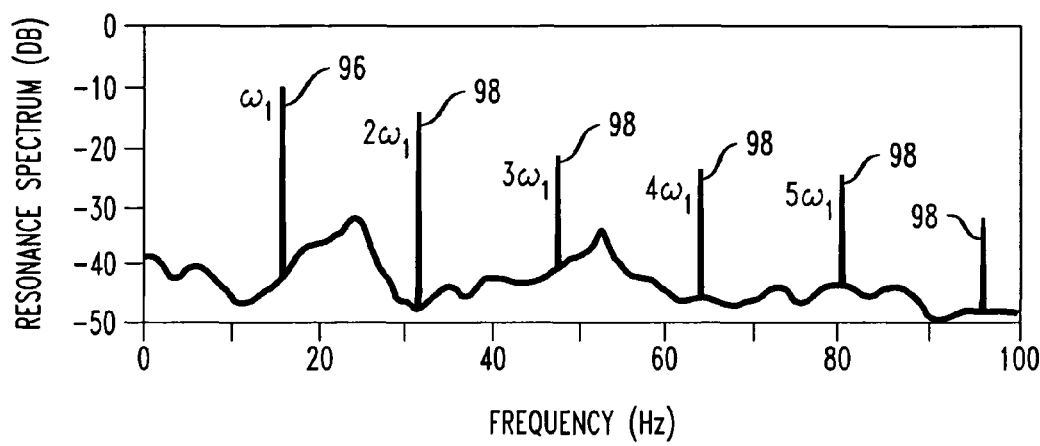
FIG. 10 shows the resonance spectrum of only one resonating element according to the state of the technology and FIG. 11 shows the resonance spectrum of two coupled resonating elements according to the invention.

FIG. 10 shows a reference diagram of a frequency spectrum for a single sinusoidal resonant frequency of a test structure that vibrates sinusoidally in exactly the same manner as a racquet, designed as an individual resonating element according to the state of the technology, excited to a single fundamental oscillation (natural frequency). This test structure exhibits a clear formation of only a single fundamental oscillation $\omega_1$ (96) in the line spectrum shown, as well as regular harmonic overtones $2\omega_1$-$5\omega_1$ (98).

Figure 11:
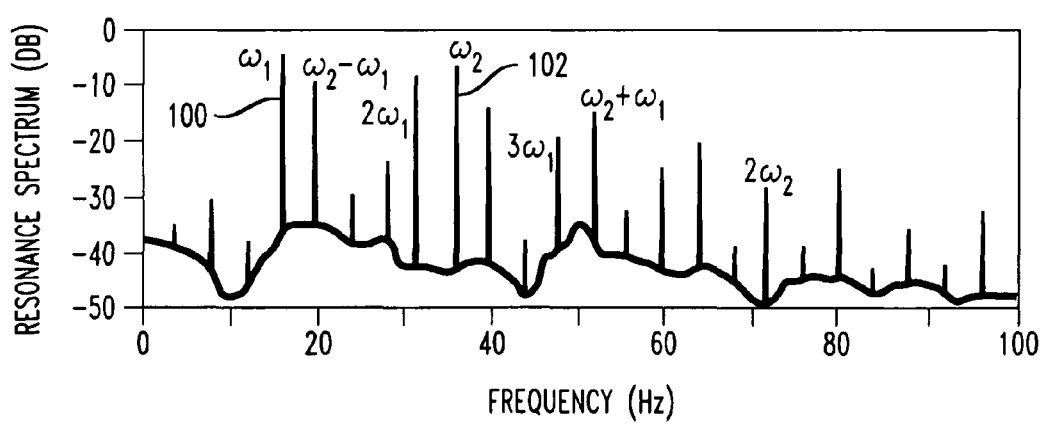

FIG. 11 shows a reference diagram of a frequency spectrum for a test structure according to the invention with two resonating elements. The spectrum exhibits a clear formation of additive as well as subtractive mixed frequencies between the fundamental oscillations $\omega_1$ and $\omega_2$ (100, 102) of the test structure, shifted in frequency due to multiple resonance, as well as the mixed frequencies $\omega_1-\omega_2$ and $\omega_1+\omega_2$ of these oscillations. As a result, a racquet according to this invention has no single constant measurable natural frequency, but a number of variable frequencies that generate a number of apparent resonances of varying frequency at the same time, along with their mixed frequencies, all depending on the load case of the structure.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A structural member to manufacture a sports equipment, in particular tennis, squash, badminton racquets, golf clubs, field hockey and ice hockey sticks and baseball bats, having two separate and discrete hollow cylindrical resonating elements arranged in parallel and having outer and inner surfaces that are each continuously convexly curved in a latitudinal cross section thereof, spaced at a distance from one another by a separate member and enclosed by a common covering with nothing interposed between the common covering and the hollow cylindrical resonating elements, and with said separate member comprising a distancing element disposed between the resonating elements, characterized in that the mass of each resonating element is greater than the mass of the distancing element, that the compressive strength of the distancing element is the highest in the direction of an axis that connects the center points of the resonating elements, and wherein the distancing element includes opposed concave ends that are conterminous with each of the respective curved outer surfaces of the resonating elements.

2. The structural member to manufacture a sports equipment according to claim 1, wherein the distancing element is made of wood or a further material having a compressive strength that varies in different directions and the highest compressive strength is along fibers of the wood or the further material.

3. The structural member to manufacture a sports equipment according to claim 1, characterized in that the width of the resonating elements is greater than the width of the distancing element.

4. The structural member to manufacture a sports equipment according to claim 1, characterized in that there are lateral through holes located in the distancing element and the covering, the holes capable of receiving strings of a webbing.

5. The structural member to manufacture a sports equipment according to claim 1, wherein the sports equipment comprises a tennis racquet with a handle and frame in which said structural member forms the frame and contains within at least one of said resonating elements, mass particles that move about freely, or fluid droplets, that dampen the recoil forces and vibrations acting on the structural member, or alternatively contains on the wall of at least one said resonating element a mass support strip or a number of mass support strips for kinetically damping mass systems.

6. The structural member to manufacture a sports equipment according to claim 1, characterized in that the covering is comprised of one or more layers of at least two plastic-impregnated laminar materials.

7. The structural member to manufacture a sports equipment according to claim 6, characterized in that the covering has first sections on the side of the resonating element that faces away from the opposite resonating element, said first sections being connected together via two second sections, wherein the laminar materials of the first sections overlap the laminar materials of the second sections in a transition zone.

8. The structural member to manufacture a sports equipment according to claim 1, wherein the structural member is disposed in the sports equipment and configured such that the resonating elements vibrate at different resonance frequencies when an object strikes the sports equipment in an intended location, and the respective resonance frequencies cancel due to interference thereby damping oscillation of the structural member and vibration of the sports equipment.

9. The structural member to manufacture a sports equipment as in claim 8, wherein the resonating elements vibrating at respective resonance frequencies approximately 180 degrees out of phase and generate an interference spectrum characterized by a structural nodal behavior with no more than two node prints.

10. The structural member to manufacture a sports equipment as in claim 1, further comprising a chamber disposed along the inner surface of each of the hollow cylindrical resonating elements and extending parallel thereto, each chamber containing mass particles that move about freely, or fluid droplets therein.

11. The structural member to manufacture a sports equipment as in claim 10, wherein each chamber occupies less than half of the volume defined by the inner surfaces of the hollow cylindrical resonating elements.

12. A structural member to manufacture a sports equipment, the structural member comprising two separate and discrete single layer hollow cylindrical resonating elements arranged in parallel and spaced at a distance from one another by a separate member comprising a distancing element disposed directly between the resonating elements, and a common covering disposed directly on and internally contacting only the resonating elements and the distancing element, characterized in that the mass of each resonating element is greater than the mass of the distancing element and the compressive strength of the distancing element is the highest in the direction of an axis that connects center points of the resonating elements, each of the hollow cylindrical resonating elements having inside and outside surfaces that are each continuously convexly curved in a latitudinal cross section thereof and the sports equipment being one of a tennis racquet, a squash racquet, a badminton racquet, a golf club, a field hockey stick, an ice hockey stick and a baseball bat.

13. The structural member as in claim 12, wherein the structural member is disposed in the sports equipment and configured such that when an object strikes the sports equipment in an intended location, the respective resonating elements vibrate at different respective resonance frequencies and the respective resonance frequencies cancel due to interference to reduce oscillation of the structural member and vibration of the sports equipment, and wherein each of the cylindrical resonating elements has a shape that is circular.

14. The structural member as in claim 12, wherein only the distancing element is disposed between the resonating elements.

15. A sports racquet comprising a handle, a frame, and strings disposed in a plane, the frame peripherally surrounding the strings and including a structural member having two separate and discrete hollow cylindrical resonating elements arranged in parallel, spaced at a distance from one another by a separate member comprising a distancing element disposed therebetween, the distancing element disposed along an axis connecting respective center points of the resonating elements and being generally orthogonal to the plane, each hollow cylindrical resonating element formed of a single layer of material having opposed inner and outer surfaces having the same shape and each of the inner and outer surfaces continuously convexly curved along a latitudinal cross section of the hollow cylindrical resonating element, wherein the resonating elements and distancing element are enclosed by a common covering that conformally covers the resonating elements and distancing element.

16. The sports racquet according to claim 15, wherein the distancing element includes opposed concave ends that are conterminous with respective outside cylindrical surfaces of the hollow cylindrical resonating elements.

17. The sports racquet as in claim 15, wherein the cover is formed of carbon fiber reinforced plastic and said resonating elements vibrate at respective resonance frequencies when an object strikes the sports racquet in an intended location, and the respective resonance frequencies cancel due to interference thereby damping oscillation of the structural member and vibration of the sports racquet, the respective resonance frequencies of the resonating elements not being identical.

18. The sports racquet as in claim 15, wherein the axis is substantially orthogonal to the plane.

19. The sports racquet as in claim 15, wherein the distancing element has a width less than a diameter of the resonating elements, the common cover conformally covers the structural member such that a distance between opposed exterior surfaces of the common cover along the distancing element is less than a diameter of the resonating elements, and the resonating elements vibrate at different resonance frequencies when an object strikes the sports racquet in an intended location.

20. The sports racquet as in claim 19, wherein the different resonance frequencies are approximately 180 degrees out of phase and further comprising a chamber disposed along an inner surface of each of the hollow cylindrical resonating elements and extending parallel thereto, each chamber containing mass particles that move about freely, or fluid droplets therein.

21. The sports racquet as in claim 19, wherein the mass of each resonating element is greater than the mass of the distancing element, a compressive strength of the distancing element being highest in a direction of the axis and the frame peripherally surrounds the strings and the intended location comprises the strings.

22. The sports racquet as in claim 19, wherein the cover is formed of metal fiber reinforced plastic in a resin matrix and interference between the superimposed resonating elements, produces a standing wave.

* * * * *